(12) United States Patent
Hallett et al.

(10) Patent No.: US 7,246,309 B2
(45) Date of Patent: Jul. 17, 2007

(54) VALIDATING ONE OR MORE DATA BLOCKS IN A COMPUTER-IMPLEMENTED DOCUMENT DERIVED FROM ANOTHER COMPUTER-IMPLEMENTED DOCUMENT

(75) Inventors: Geoffrey S. Hallett, Wokingham (GB); Philip A. B. Saddleton, Walton on Thomas (GB)

(73) Assignee: Electronic Data Systems Corporation, Plano, TX (US)

( * ) Notice: Subject to any disclaimer, the term of this patent is extended or adjusted under 35 U.S.C. 154(b) by 440 days.

(21) Appl. No.: 10/422,066

(22) Filed: Apr. 23, 2003

(65) Prior Publication Data

US 2004/0216033 A1 Oct. 28, 2004

(51) Int. Cl.
G06F 15/00 (2006.01)
G06F 17/00 (2006.01)
(52) U.S. Cl. .......................... 715/503; 715/504; 707/3; 341/50
(58) Field of Classification Search ................ 715/503, 715/504; 707/3; 341/50
See application file for complete search history.

(56) References Cited

U.S. PATENT DOCUMENTS

| | | | | |
|---|---|---|---|---|
| 5,608,395 A | * | 3/1997 | Kurtz et al. .................. | 341/50 |
| 6,625,598 B1 | * | 9/2003 | Kraffert ......................... | 707/3 |
| 2002/0035697 A1 | | 3/2002 | McCurdy et al. ........... | 713/200 |

FOREIGN PATENT DOCUMENTS

| | | | |
|---|---|---|---|
| WO | WO 96/25812 A | 8/1996 | |
| WO | WO 02/10967 A | 2/2002 | |
| WO | WO 02/10967 A2 | * | 2/2002 |

OTHER PUBLICATIONS

Gregg Rothermel et al., A methodology for testing spreadsheets, Jan. 2001, ACM Transactions on Software Engineering and Methodology (TOSEM), vol. 10 issue 1, pp. 110-147.*
Wagner and Putter, "Error Detecting Decimal Digits" *CACM*, vol. 32, No. 1, (pp. 106-110), Jan. 1989.
J. Verhoeff "Error Detecting Codes", Mathematical Centre Tracts 29, *Mathematisch Centrum Amsterdam* (121 pages), 1969.
Notification of Transmittal of the International Search Report and the Written Opinion of the International Searching Authority, or the Declaration, mailed Aug. 5, 2005, re PCT/US2004/012396 filed Apr. 23, 2004.

* cited by examiner

*Primary Examiner*—William Bashore
(74) *Attorney, Agent, or Firm*—Baker Botts L.L.P.

(57) ABSTRACT

In one embodiment, a system for validating one or more data blocks in a document derived from another document includes one or more processors collectively operable to (1) access a number of first values in a predetermined portion of a source document; (2) apply a code-generating algorithm to the first values to generate a first code representing the first values; (3) access a number of second values in a predetermined portion of a document derived from the source document, the predetermined portion of the derived document corresponding to the predetermined portion of the source document; (4) apply the code-generating algorithm to the second values to generate a second code representing the second values. If the first code matches the second code, it can be assumed that within a predefined probability the derived document was accurately derived from the source document in that the second values match the first values.

32 Claims, 5 Drawing Sheets

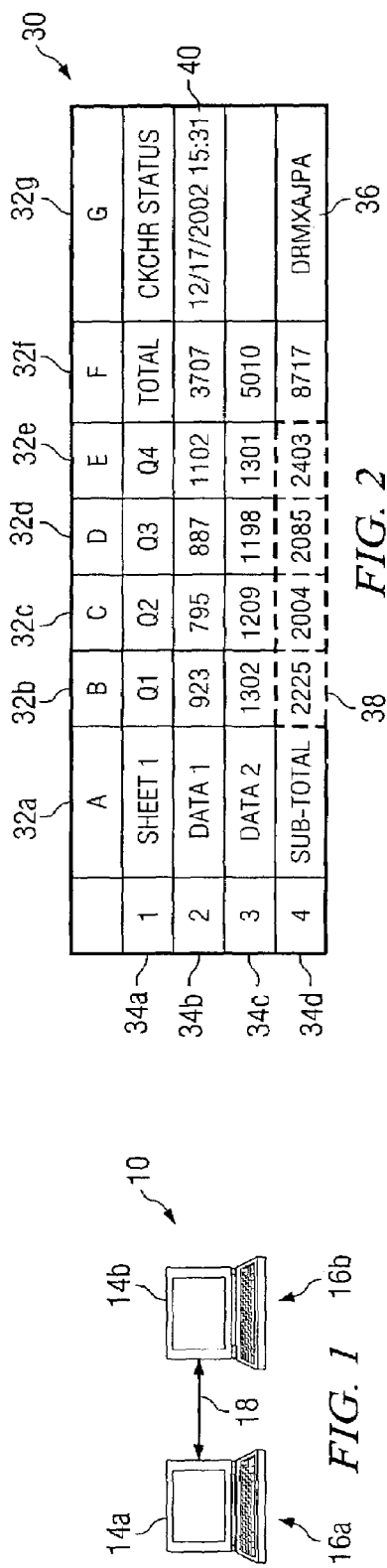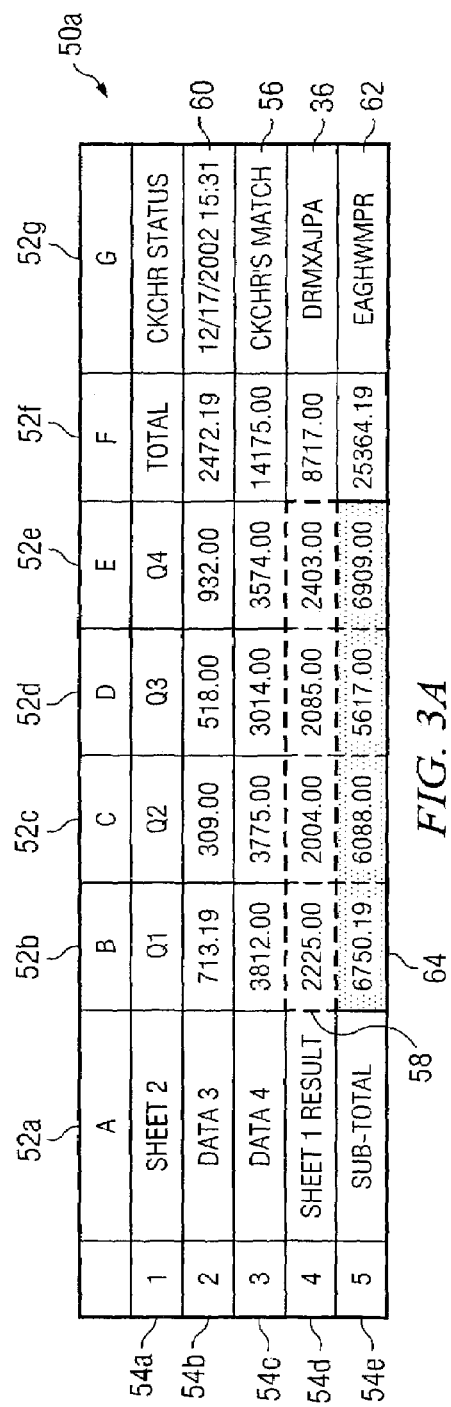

FIG. 3B

| | A | B | C | D | E | F | G |
|---|---|---|---|---|---|---|---|
| 1 | SHEET 2 | Q1 | Q2 | Q3 | Q4 | TOTAL | CKCHR STATUS |
| 2 | DATA 3 | 713.19 | 309.00 | 518.00 | 932.00 | 2472.19 | 12/17/2002 15:31 |
| 3 | DATA 4 | 3812.00 | 3775.00 | 3014.00 | 3574.00 | 14175.00 | DATA ERROR |
| 4 | SHEET 1 RESULT | 2225.00 | 2004.00 | 2085.00 | 2401.00 | 8715.00 | DRMXAJPA |
| 5 | SUB-TOTAL | 6750.19 | 6088.00 | 5617.00 | 6907.00 | 25362.19 | ATMTBEKV |

FIG. 3C

| | A | B | C | D | E | F | G |
|---|---|---|---|---|---|---|---|
| 1 | SHEET 2 | Q1 | Q2 | Q3 | Q4 | TOTAL | CKCHR STATUS |
| 2 | DATA 3 | 713.19 | 309.00 | 518.00 | 932.00 | 2472.19 | 12/17/2002 15:31 |
| 3 | DATA 4 | 3812.00 | 3775.00 | 3014.00 | 3574.00 | 14175.00 | CKCHR INVALID |
| 4 | SHEET 1 RESULT | 2225.00 | 2004.00 | 2085.00 | 2403.00 | 8717.00 | DRMXAJPU |
| 5 | SUB-TOTAL | 6750.19 | 6088.00 | 5617.00 | 6909.00 | 25364.19 | EAGHWMPR |

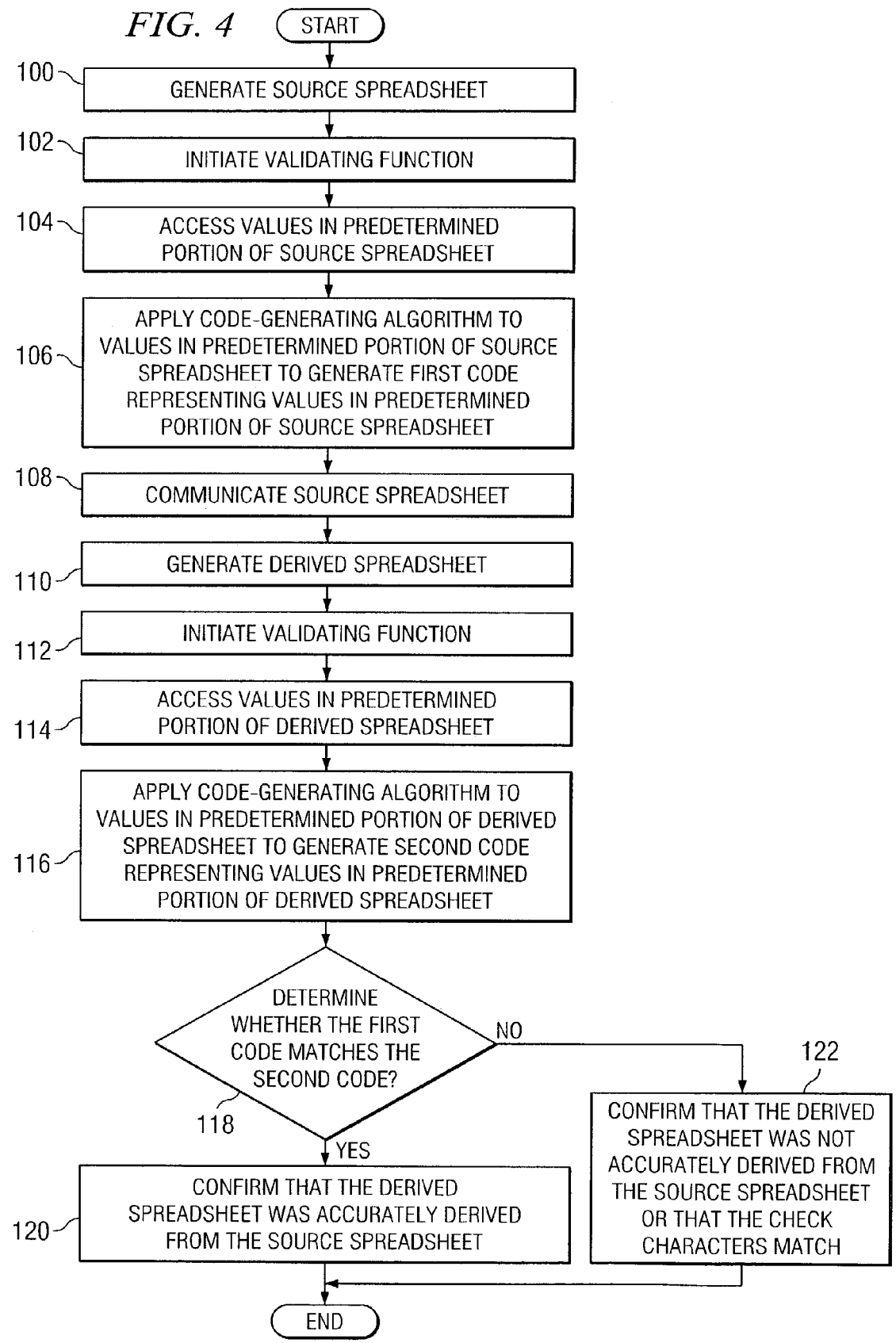

FIG. 5A

| | A | B | C | D | E | F | G | H | I |
|---|---|---|---|---|---|---|---|---|---|
| 1 | SHEET 1 | Q1 | Q2 | Q3 | Q4 | TOTAL | TEST | CKCHR | STATUS |
| 2 | DATA 1 | 923.00 | 795.00 | 887.00 | 1102.00 | 3707.00 | WTYR | | |
| 3 | DATA 2 | 1302.00 | 1209.00 | 1198.00 | 1301.00 | 5010.00 | MAMD | | |
| 4 | SUB-TOTAL | 2225.00 | 2004.00 | 2085.00 | 2403.00 | 8717.00 | | | |
| 5 | TEST | JHTF | SBQX | CRXZ | YKXL | | CLCE | CLCE | 20/01/03 10:37 |

FIG. 5B

| | A | B | C | D | E | F | G | H | I |
|---|---|---|---|---|---|---|---|---|---|
| 1 | SHEET 2 | Q1 | Q2 | Q3 | Q4 | TOTAL | TEST | REGEN | STATUS |
| 2 | DATA 1 | 923.00 | 795.00 | 887.00 | 1102.00 | 3707.00 | WTYR | WTYR | |
| 3 | DATA 2 | 1302.00 | 1209.00 | 1198.00 | 3101.00 | 6810.00 | MAMD | JLAH | |
| 4 | SUB-TOTAL | 2225.00 | 2004.00 | 2085.00 | 4203.00 | 10517.00 | | | |
| 5 | TEST | JHTF | SBQX | CRXZ | YKXL | | CLCE | | |
| 6 | REGEN CKCHR | JHTF | SBQX | CRXZ | LRQC | | | PGXF | 20/01/03 10:25 DATA ERROR |

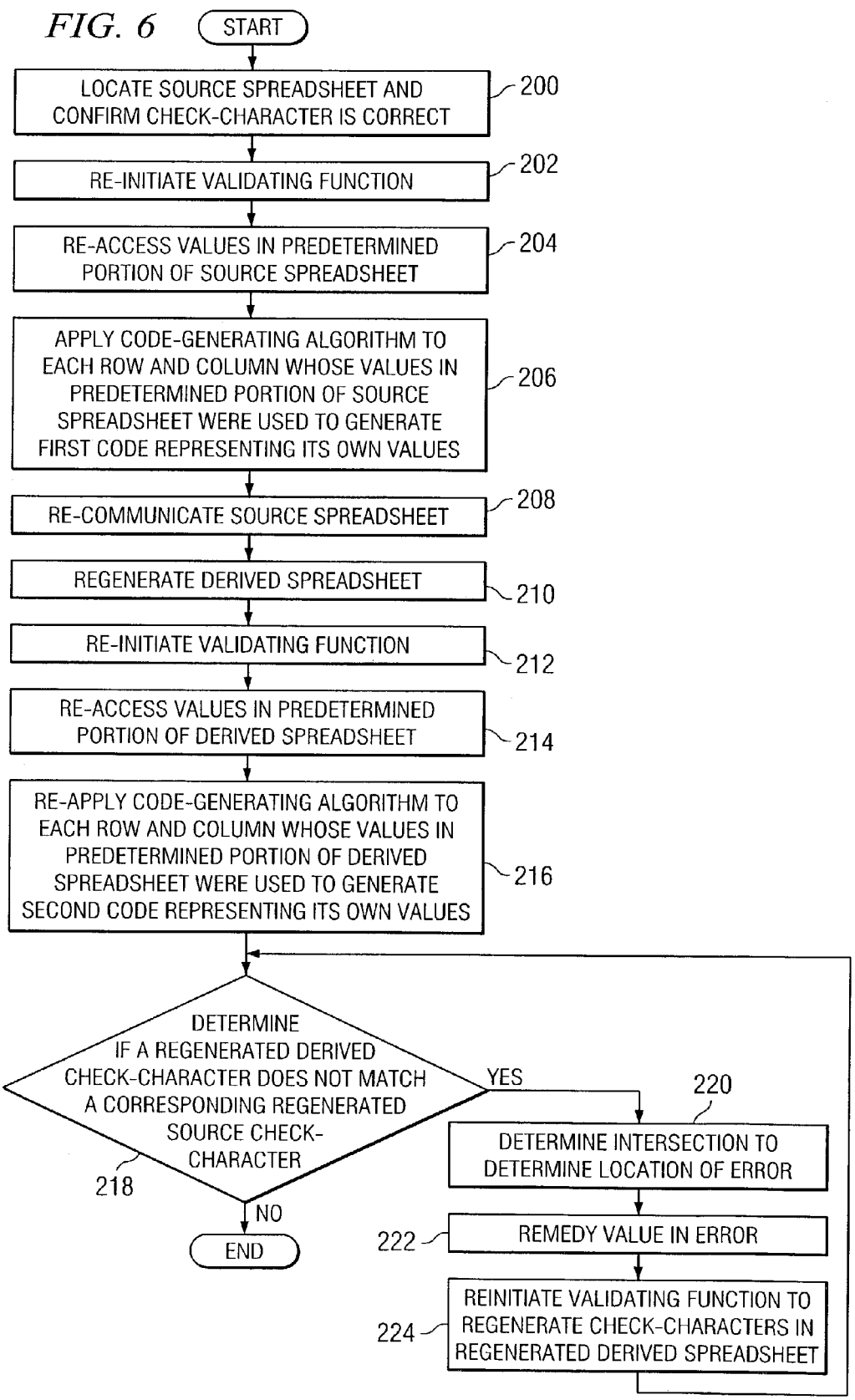

VALIDATING ONE OR MORE DATA BLOCKS IN A COMPUTER-IMPLEMENTED DOCUMENT DERIVED FROM ANOTHER COMPUTER-IMPLEMENTED DOCUMENT

TECHNICAL FIELD OF THE INVENTION

This invention relates generally to computer-implemented documents and more particularly to validating one or more data blocks in a computer-implemented document derived from another computer-implemented document.

BACKGROUND OF THE INVENTION

Documents are commonly used to present information to a reader. For example, spreadsheets may be used to organize data into a visually attractive and consolidated format. The contents of a document such as a spreadsheet are often assumed to be valid and accurate. However, errors may occur when text or data, such as numeric or text data, is entered into a document, such as when a new document is derived by copying data blocks from an existing document. Errors may be entered due to typographical errors, phonetic errors, mathematical errors, or other sources of error. In other cases, errors may be generated during transmittal of a document via a network or other connection. These and other sources of errors in document data may cause problems for systems or persons relying on the accuracy of such text or data.

SUMMARY OF THE INVENTION

According to the present invention, disadvantages and problems associated with previous techniques for validating document data may be reduced or eliminated.

In one embodiment, a system for validating one or more data blocks in a document derived from another document includes one or more processors collectively operable to access a number of first values in a predetermined portion of a source document and apply a code-generating algorithm to the first values to generate a first code representing the first values in the predetermined portion of the source document. The one or more processors are further operable to access a number of second values in a predetermined portion of a document derived from the source document, the predetermined portion of the derived document corresponding to the predetermined portion of the source document, and apply the code-generating algorithm to the second values to generate a second code representing the second values in the predetermined portion of the derived document. If the first code representing the first values in the predetermined portion of the source document matches the second code representing the second values in the predetermined portion of the derived document, it can be assumed that within a predefined probability the derived document was accurately derived from the source document in that the second values in the predetermined portion of the derived document match the first values in the predetermined portion of the source document.

In another embodiment, a computer-implemented system is operable to generate a visual display representing a document derived from another document. The visual display includes a number of second values in a predetermined portion of a document derived from a source document, the predetermined portion of the derived document corresponding to a predetermined portion of the source document including a number of first values. The visual display also includes an indicator indicating whether a second code representing the second values in the predetermined portion of the derived document, the second code having been generated by accessing the second values in the predetermined portion of the derived document and applying a code-generating algorithm to the second values in the predetermined portion of the derived document matches a first code representing the first values in the predetermined portion of the source document, the first code having been generated by accessing the first values in the predetermined portion of the source document and applying a code-generating algorithm to the first values in the predetermined portion of the source document. If the second code representing the second values in the predetermined portion of the derived document matches the first code representing the first values in the predetermined portion of the source document, it can be assumed that within a predefined probability the derived document was accurately derived from the source document in that the second values in the predetermined portion of the derived document match the first values in the predetermined portion of the source document.

Particular embodiments of the present invention may provide one or more technical advantages. For example, in certain embodiments, a user may validate data blocks, such as numeric or text data blocks, in a document derived from a source document rather than manually comparing individual data blocks or simply assuming the contents of the derived document are accurate. In certain embodiments, the first and second codes may be compared manually to validate the derived document, while in certain embodiments the first and second codes may be compared automatically to validate the derived document. The present invention may improve the chances of identifying errors in the derived document. For example, the chances of identifying errors such as typographical errors, phonetic errors, mathematical errors, transmission errors, or other errors may be improved. Identifying such errors in document data may reduce or eliminate problems for businesses or persons that rely on the accuracy of such data. Certain embodiments of the present invention may provide some, all, or none of the above advantages. Certain embodiments may provide one or more other technical advantages, one or more of which may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which:

FIG. 1 illustrates an example system for validating one or more data blocks in a computer-implemented document derived from another computer-implemented document;

FIG. 2 illustrates an example computer-implemented source spreadsheet, which may be generated by a first user at a first site;

FIGS. 3A-3C illustrate example computer-implemented derived spreadsheets, which may be derived from the computer-implemented source spreadsheet by a second user at a second site;

FIG. 4 illustrates an example method for validating one or more data entries in a computer-implemented spreadsheet derived from another computer-implemented spreadsheet;

FIGS. 5A-5B illustrate an example computer-implemented regenerated source spreadsheet and an example computer-implemented regenerated derived spreadsheet, which may be used to identify the location of one or more errors in the derived spreadsheet; and FIG. 6 illustrates an example method for identifying the location of one or more errors in a computer-implemented spreadsheet derived from another computer-implemented spreadsheet.

DESCRIPTION OF EXAMPLE EMBODIMENTS

FIG. 1 illustrates an example system 10 for validating one or more data blocks in a computer-implemented document derived from another computer-implemented document. In one embodiment, system 10 includes a user system 14a operating at a first site 16a and a user system 14b operating at a second site 16b. However, the present invention contemplates any number of user systems 14 at any number of sites 16. Furthermore, the present invention contemplates user systems 14a and 14b being the same or different user systems 14 and contemplates sites 16a and 16b being the same or different sites 16 at the same or different physical locations. User system 14a at site 16a and user system 14b at site 16b may be coupled to one another using a link 18 that includes one or more computer buses, one or more local area networks (LANs), one or more metropolitan area networks (MANs), one or more wide area networks (WANs), at least a portion of a global computer network such as the Internet, or one or more other suitable wireline, optical, wireless, or other links. User systems 14 and associated components may each operate on one or more computer systems at one or more locations. Although user systems 14 are described primarily as being separate, user systems 14 may share one or more computer resources or other appropriate resources according to particular needs. User systems 14 may be any suitable computer systems or associated users that create, develop, derive, or use computer-implemented documents. Where appropriate, reference to user system 14 is meant to include one or more associated human users.

In general, the present invention enables user system 14b at site 16b to manually or autonomously validate one or more data blocks in a document (the derived document) derived from another document (the source document) associated with user system 14a at site 16a. Although the source document associated with user system 14a at site 16a may have been initially created at site 16a, the present invention contemplates the source spreadsheet generated at site 16a being derived from a previous source. A document may include a spreadsheet, a text document, an e-mail, a web page, program source code, or any other suitable type of document. In one embodiment where the document includes a spreadsheet, the data block may include a data entry in the spreadsheet or any other suitable data block. In an embodiment where the document includes a text document, the data block may include a letter, a word, a phrase, a sentence, a paragraph, or any other suitable data block.

Where the source document is a spreadsheet, user system 14a may generate the source document using MICROSOFT EXCEL, LOTUS 1-2-3, or any other suitable software for generating spreadsheets. Where the source document is a text document, user system 14a may generate the source document using MICROSOFT WORD, COREL WORD-PERFECT, MICROSOFT OUTLOOK, NOVELL GROUP-WISE, or any other suitable software for generating text documents. User system 14a may manually or autonomously initiate a validating function associated with user system 14a, which accesses a number of values in a predetermined portion of the source document and applies a code-generating algorithm to the values in the predetermined portion of the source document to generate a code representing the values in the predetermined portion of the source document.

User system 14a may communicate the source document to a user system 14b at site 16b or otherwise make the source document accessible to user system 14b, such as by storing the source document in a database accessible to user system 14b. User system 14b may at any time thereafter derive the derived document from the source document. The source document may be communicated or otherwise made accessible to user system 14b in any suitable manner and the derived document may be derived in any suitable manner. For example, the source document may be transmitted via link 18 from user system 14a to user system 14b, such as by electronic mail. As another example, user system 14a may call user system 14b using a traditional telephone connection, and user system 14a may simply read the contents of the source document to user system 14b so that user system 14b can create the derived document based on what is heard. As yet another example, user system 14a may transmit a copy of the source document via a facsimile machine to user system 14b such that user system 14b may create the derived document based on the received copy of the source document. The source document communicated from user system 14a to user system 14b may contain the code generated through application of the code-generating algorithm to the values in the predetermined portion of the source document.

To validate one or more data entries in the derived document, user system 14b may manually or autonomously initiate a validating function associated with user system 14b, which accesses a number of values in a predetermined portion of the derived document and applies the code-generating algorithm to the values in the predetermined portion of the derived document to generate a code representing the values in the predetermined portion of the derived document. If the code representing the values in the predetermined portion of the source document matches the code representing the values in the predetermined portion of the derived document, it can be assumed that within a predefined probability the derived document was accurately derived from the source document in that the values in the predetermined portion of the derived document match the values in the predetermined portion of the source document. In one embodiment, the validating function initiated by user system 14b may, automatically upon generation of the code representing the values in the predetermined portion of the derived document, compare the code representing the values in the predetermined portion of the source document to the code representing the values in the predetermined portion of the derived document to determine whether the values match. In another embodiment, user system 14b may visually compare the code representing the values in the predetermined portion of the source document to the code representing the values in the predetermined portion of the derived document to determine whether the values match.

In certain embodiments, determining whether the values match may involve determining whether the values match exactly. In other embodiments, determining whether the values match may involve determining whether the values match within a specified tolerance range. Furthermore, although this description primarily describes one code representing values in the predetermined portion of the source document and one code representing values in the predetermined portion of the derived document, the present invention contemplates multiple codes for the source document, each code representing its own predetermined portion of the source document, and multiple codes for the derived document, each code representing its own corresponding predetermined portion of the derived document.

Particular embodiments of the present invention may provide one or more technical advantages. For example, in certain embodiments, a user may validate data blocks, such as numeric or text data blocks, in a document derived from a source document rather than manually comparing individual data blocks or simply assuming the contents of the derived document are accurate. In certain embodiments, the first and second codes may be compared manually to validate the derived document, while in certain embodiments the first and second codes may be compared automatically to validate the derived document. The present invention may improve the chances of identifying errors in the derived document. For example, the chances of identifying errors such as typographical errors, phonetic errors, mathematical errors, transmission errors, or other errors may be improved. Identifying such errors in document data may reduce or eliminate problems for businesses or persons that rely on the accuracy of such data.

FIG. 2 illustrates an example source spreadsheet 30, which may be generated by a user system 14a at site 16a. While the source document is described as being a source spreadsheet in connection with the example of FIG. 2 and throughout the remainder of this description, the present invention contemplates a source document being a spreadsheet, a text document, an e-mail, a web page, program source code, or any other suitable type of document. Source spreadsheet 30 may be generated using MICROSOFT EXCEL, LOTUS 1-2-3, or any other suitable software for generating spreadsheets. Source spreadsheet 30 includes a number of columns 32 and rows 34, each intersection of a column 32 and a row 34 forming a cell. Particular cells in source spreadsheet 30 may include numerical values, alphabetic characters, symbols, or any other suitable data entries according to particular needs. While the data blocks are described as data entries, the present invention contemplates any suitable data blocks, such as words in a text document, according to particular needs. In this description, particular cells in source spreadsheet 30 will be referenced in the following format: (Column #,Row #). For example, cell (B,2) in source spreadsheet 30 includes the value 923. In addition, a series of cells in the same row of spreadsheet 30 will be referenced as (Column #,Row #:Column #,Row #). For example, (B,3:E,3) describes the series of cells containing the values "1302," "1209," "1198," and "1301."

Source spreadsheet 30 may include a code 36 representing a number of values in a predetermined portion 38 of source spreadsheet 30. In the illustrated source spreadsheet 30, predetermined portion 38 includes cells (B,4:E,4) containing values "2225," "2004," "2085," and "2403." However, predetermined portion 38 may include any suitable portion of source spreadsheet 30 according to particular needs. For example, predetermined portion 38 of source spreadsheet 30 may include one or more individual cells of source spreadsheet 30, one or more rows 32 of source spreadsheet 30, one or more columns 34 of source spreadsheet 30, any combination of one or more rows 32 and one or more columns 34 of source spreadsheet 30, or any other suitable portion of source spreadsheet 30 according to particular needs. Code 36 may be generated by accessing the values in predetermined portion 38 of source spreadsheet 30 and applying a code-generating algorithm to the values in predetermined portion 38 of source spreadsheet 30. For example, in source spreadsheet 30, code 36 is "DRMXAJPA" and is generated by accessing the values in cells (B,4:E,4) (i.e. "2225," "2004," "2085" and "2403") and applying the code-generating algorithm to these values. (Source spreadsheet 30 may also include a date and time stamp 40, which may be updated when code 36 is generated or at any other suitable time.) Although code 36 is shown as being a cell in source spreadsheet 30, code 36 may be at any suitable location. For example, in an embodiment in which the source document is a text document, code 36 may be included as a header, a footer, or at any other suitable location. Date and time stamp 40 may also be included as a header, a footer, or at any other suitable location.

The code-generating algorithm may be any suitable algorithm for generating codes to represent the numerical values in predetermined portions of spreadsheets. In one embodiment, the code-generating algorithm includes calculating a weighted sum of the digits of the numerical values in the cells within predetermined portion 38. The weights selected may depend on the position of the cell in predetermined portion 38 and the position of the digit in the numerical value in the cell. For example, the weights may be chosen such that if the numerical values in the cells within predetermined portion 38 each contain a given fixed number of digits, the calculated weighted sum is equivalent to the calculated weighted sum obtained by concatenating all of the numerical values in the predetermined portion and applying the code-generating algorithm to a single cell, for example, containing the concatenated numerical value. The code-generating algorithm may also include applying a modulus(p) function to the calculated weighted sum of the digits of the numerical values in the cells within predetermined range 38 to determine a result. Although it may be preferable for p to be a prime number, p may be any suitable number according to particular needs. The code-generating algorithm may further include converting the determined result into alphabetic characters with the possibility of one or more check-characters, resulting in code 36 (e.g., "DRMXAJPA" in source spreadsheet 30). Alphabetic characters within code 36 may be referred to as check-characters.

As an example, using the Base23 algorithm raised by the power two for a double-check-character, code 36 may be calculated for the series of numbers 987654321 according to the following formula: ((9×1)+(8×466)+(7×111)+(6×472)+(5×292)+(4×92)+(3×509)+(2×275)+(1×15)) modulus p. In this example, p may be the first lower prime number to 23 raised to the power X where X is a specified number of digits, possibly determined as a parameter to the validating function. Thus, using three as a default for X in this example, 23^3 is 12,167, resulting in a prime number of 12,163 for p, which may be input into the above formula to determine code 36. In one embodiment, the code-generating algorithm may be derived from a Base23 complement algorithm and include one or more check-characters, which converts the determined result into alphabetic characters "A" through "Z," omitting "I", "O" and "U". Although alphabetic characters are described, the determined result may be converted to numbers, symbols, or any other suitable characters according to particular needs.

In one embodiment, the code-generating algorithm is a function imbedded within a spreadsheet-generating program such as MICROSOFT EXCEL, LOTUS 1-2-3, or any other suitable program for generating spreadsheets. For example only, and not by way of limitation, the code-generating function may be imbedded within a MICROSOFT EXCEL adding function called "checksum." In this example, in cell (G,4) of source spreadsheet 30, the "checksum" function call may take the form "=checksum(B4:E4,3,2)," where "3" may indicate the number of characters required in code 36 and "2" may indicate the decimal precision required. It may be preferable to establish ranges for the last two positions in the function call (the position held by the numbers "3" and "2"). For example, the ranges may be one through seven for the number of characters required in code 36 and zero through seven for the decimal precision required (to be input as the power X described above, for example), with defaults of "3" and "2," respectively. In determining whether code 36 representing the values in predetermined portion 38 of source spreadsheet 30 match the code representing the values in the predetermined portion of the derived spreadsheet, the number of characters required in code 36 may affect the accuracy of the determination. For example, the number of characters required in code 36 may be the inverse to a tolerance for error, because requiring more characters in code 36 may improve the accuracy of the determination. However, increasing the number of characters may, in certain embodiments, increase the possibility for error. For example, if code 36 is being visually compared to code 36 in the derived spreadsheet, a longer code may increase the chance for human error in making the comparison. Although three characters (excluding any check-characters in this example) may be preferable for the size of code 36, these considerations may be balanced according to particular needs to determine the size of code 36. The number of cells per code 36 (i.e. the size of predetermined portion 38) may also affect the probability that an error is detected. For example, in certain embodiments, the larger predetermined portion 38 becomes, the higher the probability may be that an error is detected. Thus, an optimal size for predetermined portion 38 may be determined according to particular needs. In one embodiment, the code 36 check-character may include a weighted check-digit such that when a separate algorithm is applied to the resulting alphabetic characters, the numeric equivalent, when summed, is zero, which may indicate a code 36 check-character free of error.

The code-generating algorithm chosen may also affect the likelihood that non-matching values are detected and the types of non-matching values that are detected. For example, the code-generating algorithm described above may detect an error restricted to a number of consecutive digits less than or equal to the number of characters (excluding any check-characters) in code 36. This may include errors such as errors in a single digit, transposition of an adjacent pair of digits, phonetic errors (e.g., "thirty" for "thirteen"), and certain other errors. In certain embodiments, this type of error may always be detected. In particular embodiments in which the code-generating algorithm described above (derived from the Base23 algorithm) is used, the code-generating algorithm may also detect a transposition of pairs of digits within twenty-three digits of each other. In certain embodiments, this type of error may always be detected. Other than the types of errors just described, in certain embodiments, the probability that any combination of unrelated errors will go undetected may be approximately 1/p, where p is the chosen modulus. This may reduce exponentially according to the number of characters required for code 36. For example, the probability of detecting an error using three characters in code 36 may be better than approximately 99.99%, while the probability of detecting an error using seven characters in code 36 may be better than approximately 99.99999997%, or less than approximately one error in 3.4 billion. Thus, it can be assumed within a predefined probability that a spreadsheet derived from source spreadsheet 30 was accurately derived from the source spreadsheet if the second values in the predetermined portion of the derived spreadsheet match the first values in the predetermined portion 38 of source spreadsheet 30.

FIGS. 3A-3C illustrate example derived spreadsheets 50*a*-50*c*, respectively, which may be derived from source spreadsheet 30 by user system 14*b* at site 16*b*. While the derived document is described as being a derived spreadsheet in connection with the example of FIGS. 3A-3C and throughout the remainder of this description, the present invention contemplates a derived document being a spreadsheet, a text document, or any other suitable type of document. Derived spreadsheet 50 may be generated using MICROSOFT EXCEL, LOTUS 1-2-3, or any other suitable software for generating spreadsheets. Derived spreadsheet 50 may be generated using the same spreadsheet-generating software used to generate source spreadsheet 30. Derived spreadsheet 50 includes a number of columns 52 and rows 54, each intersection of a column 52 and a row 54 forming a cell. Particular cells in derived spreadsheet 50 may include numerical values, alphabetic characters, symbols, or any other suitable data entries according to particular needs. In this description, particular cells in derived spreadsheet 50 will be referenced in the same manner as described above for referencing particular cells in source spreadsheet 30 (i.e. (Column#,Row #)). In addition, multiple cells in the same row of spreadsheet 30 will be referenced in the same manner as described above for referencing a series of cells in the same row of source spreadsheet 30 (i.e. (Column #, Row #:Column #,Row #)).

Derived spreadsheet 50 may include predetermined portion 58, which may be derived from predetermined portion 38 of source spreadsheet 30. For example, cells (B,4:E,4) of derived spreadsheet 50 (predetermined portion 58 of derived spreadsheet 50) may be derived from cells (B,4:E,4) of source spreadsheet 30 (predetermined portion 38 of source spreadsheet 30). In the illustrated example derived spreadsheet 50*a*, the data entries being validated may include this predetermined portion 58, specifically the values in cells (B,4), (C,4), (D,4), and (E,4). Derived spreadsheet 50 may include code 36 representing the values in predetermined portion 38 of source spreadsheet 30. A new code representing the values in predetermined portion 58 of a derived spreadsheet 50 may be generated by accessing the values in predetermined portion 58 of derived spreadsheet 50 and applying the code-generating algorithm to the values in predetermined portion 58 of derived spreadsheet 50. In one embodiment, although not illustrated, it may be desirable for derived spreadsheet 50 to include an entry for the new code representing the values in predetermined portion 58 of derived spreadsheet 50 such that the new code may be visually compared to code 36 to determine whether the values in predetermined portion 58 match the values in predetermined portion 38. The new code representing the values in predetermined portion 58 of derived spreadsheet 50 may be manually or autonomously compared with code 36 representing the values in predetermined portion 38 of source spreadsheet 30 to determine if the new code matches code 36. If the new code is determined to match code 36, it can be assumed that within a predefined probability derived spreadsheet 50 was accurately derived from source spreadsheet 30 in that the values in predetermined portion 58 of derived spreadsheet 50 match the values in predetermined portion of source spreadsheet 30. In one embodiment, derived spreadsheet 50 includes a comparison indicator 56 indicating, for example, "TRUE", "Match", or the like if a match is determined or "FALSE", "ERROR", or the like if the new code is determined to not match code 36. Where the new code is autonomously compared with code 36, comparison indicator 56 may be automatically supplied. Alternatively, comparison indicator 56 may result from a manually entered check-character into derived spreadsheet 50.

Derived spreadsheet 50 may also include a date and time stamp 60, which may indicate when the new code was generated or when the new code was compared to code 36. In one embodiment, the validating function initiated by user system 14*b* may compare the new code to code 36, automatically upon generation of the new code representing the second values in predetermined portion 58 of derived spreadsheet 50, for example, and simultaneously update date and time stamps 40 and 58 to reflect the date and time of the comparison. Derived spreadsheet 50 may also include an updated code 62, which may represent another predetermined portion 64 of derived spreadsheet 50. For example, in the illustrated example, predetermined portion 64 includes a portion of row 54*e*, which includes new sub-total information. As an example, updated code 62 may be used in validating data entries in a third spreadsheet derived from derived spreadsheet 50. Although updated code 62 is shown as being a cell of derived spreadsheet 50, updated code 62 may be at any suitable location. For example, in an embodiment in which the derived document is a text document, updated code 62 may be included as a header, a footer, or at any other suitable location. Date and time stamp 40 may also be included as a header, a footer, or at any other suitable location. Derived spreadsheet 50 may include any other suitable information according to particular needs.

FIG. 3A illustrates derived spreadsheet 50*a*, in which the code representing predetermined portion 58 of derived spreadsheet 50*a* is automatically determined to match code 36 representing predetermined portion 38 of source spreadsheet 30. Thus, it may be confirmed that the values in predetermined portion 58 of derived spreadsheet 50*a* match the values in predetermined portion 38 of source spreadsheet 30. For example, it can be confirmed that the values in cells (B,4), (C,4), (D,4), and (E,4) of spreadsheet 50 match the values in cells (B,4), (C,4), (D,4), and (E,4) of spreadsheet 30, respectively. Comparison indicator 56 may include "TRUE", "Match", or the like to indicate that a match was determined.

FIG. 3B illustrates derived spreadsheet 50*b*, in which the code representing predetermined portion 58 of derived spreadsheet 50*b* is automatically determined to not match code 36 representing predetermined portion 38 of source spreadsheet 30. Thus, it may be confirmed that the values in predetermined portion 58 of derived spreadsheet 50*b* do not match the values in predetermined portion 38 of source spreadsheet 30. For example, it can be confirmed that at least one value in cells (B,4), (C,4), (D,4), and (E,4) does not match a corresponding value in cells (B,4), (C,4), (D,4), and (E,4) of source spreadsheet 30, respectively. In the illustrated example, the value in cell (E,4) of derived spreadsheet 50*b* is "2401," but the value in cell (E,4) of source spreadsheet 30 is "2403." Comparison indicator 56 may include "FALSE", "ERROR", or the like to indicate that a match was not determined.

FIG. 3C illustrates derived spreadsheet 50*c*, in which the code representing predetermined portion 58 of derived spreadsheet 50*c* is automatically determined to not match code 36 representing predetermined portion 38 of source spreadsheet 30. Thus, it may be confirmed that although the values in predetermined portion 58 of derived spreadsheet 50*c* correctly match the values in predetermined portion 38 of source spreadsheet 30, code 36 was incorrectly applied. For example, it can be confirmed that at least one character in cell (G,4) of derived spreadsheet 50*c* does not match a corresponding value in cell (G,4) of source spreadsheet 30. In the illustrated example, the value in cell (G,4) of derived spreadsheet 50*c* is "DRMXAJPU," but the value in cell (G,4) of source spreadsheet 30 is "DRMXAJPA." Comparison indicator 56 may include "FALSE", "ERROR", "INVALID", or the like to indicate that a check-character match was not determined.

FIG. 4 illustrates an example method for validating one or more data entries in a spreadsheet derived from another spreadsheet. At step 100, user system 14*a* generates source spreadsheet 30. As described above, user system 14*a* may create, develop, derive, or in any other manner generate source spreadsheet 30. At step 102, user system 14*a* manually or autonomously initiates a validating function associated with user system 14*a*. The validating function accesses a number of values in predetermined portion 38 of source spreadsheet 30 at step 104. Predetermined portion 38 of source spreadsheet 30 may include any suitable portion of source spreadsheet 30 according to particular needs. For example, predetermined portion 38 of source spreadsheet 30 may include one or more individual cells, one or more rows 32 of source spreadsheet 30, one or more columns 34 of source spreadsheet 30, any combination of one or more rows 32 and one or more columns 34 of source spreadsheet 30, or any other suitable portion according to particular needs. At step 106, the validating function applies the code-generating algorithm to the values in predetermined portion 38 of source spreadsheet 30 to generate code 36 representing the values in predetermined portion 38 of source spreadsheet 30. In one embodiment, the code-generating algorithm includes calculating a weighted sum of each digit of the numerical values in the cells within predetermined portion 38 of source spreadsheet 30, applying a modulus(p) function to the calculated weighted sum of the digits of the numerical values in the cells within predetermined portion 38 to determine a result and converting the determined result into alphabetic characters and, in some embodiments including a check-digit, resulting in code 36. As described above, code 36 may include any combination of alphabetic characters, numbers, symbols, or other suitable characters according to particular needs.

At step 108, user system 14*a* communicates source spreadsheet 30 to user system 14*b* at site 16*b* or otherwise makes source spreadsheet 30 accessible to user system 14*b*, such as by storing source spreadsheet 30 in a database accessible to user system 14*b*. User system 14*a* may communicate source spreadsheet 30 to user system 14*b* in any suitable manner according to particular needs. For example, user system 14*a* may transmit source spreadsheet 30 via electronic mail, read the contents of source spreadsheet 30 to user system 14*b* over the telephone, or transmit a copy of source spreadsheet 30 by facsimile. At step 110, user system 14*b* generates derived spreadsheet 50 using the received communication from user system 14*a* regarding source spreadsheet 30. User system 14*b* manually or autonomously initiates a validating function associated with user system 14*b* at step 112 and, at step 114, the validating function accesses a number of values in predetermined portion 58 of derived spreadsheet 50 corresponding to predetermined portion 38 of source spreadsheet 30. At step 116, the validating function applies the code-generating algorithm to the values in predetermined portion 58 of derived spreadsheet 50 to generate a new code representing the values in predetermined portion 58 of derived spreadsheet 50.

At step 118, it is determined whether code 36 representing the values in predetermined portion 38 of source spreadsheet 30 matches the new code representing the values in predetermined portion 58 of derived spreadsheet 50. In one embodiment, the validating function initiated by user system 14b, automatically upon generation of the new code representing the values in predetermined portion 58 of derived spreadsheet 50, compares code 36 to the new code to determine whether the values in predetermined portion 38 of source spreadsheet 30 match the values in predetermined portion 58 of derived spreadsheet 50. In another embodiment, user system 14b may visually compare code 36 to the new code to determine whether the values in predetermined portion 38 of source spreadsheet 30 match the values in predetermined portion 58 of derived spreadsheet 50. If it is determined at step 118 that code 36 matches the new code, then it can be assumed at step 120 that within a predefined probability derived spreadsheet 50 was accurately derived from source spreadsheet 30 in that the values in predetermined portion 58 of derived spreadsheet 50 match the values in predetermined portion of source spreadsheet 30. If it is determined at step 118 that code 36 does not match the new code, then it can be confirmed at step 122 that either the derived spreadsheet 50 was not accurately derived from source spreadsheet 30 in that the values in predetermined portion 58 of derived spreadsheet 50 do not match the values in predetermined portion of source spreadsheet 30 or that the check-character do not match. Remedial action may be required in order to locate the source of the error as described below with reference to FIGS. 5A-5B and 6, for example.

Although FIG. 4 describes a particular method for validating one or more data blocks in a computer-implemented document derived from another computer-implemented document, the present invention contemplates any other suitable method. For example, user 14a may generate a source document and communicate the document to user 14b for review, revision, signing, or any other suitable purpose. User 14b may communicate the document back to user 14a. User 14a may desire to determine whether the document has changed and thus may initiate the validating function on the source document and the document received from user 14b (the derived document) to make this determination.

FIGS. 5A-5B illustrate an example regenerated source spreadsheet 70 and regenerated derived spreadsheet 90, which may be used to identify the location of one or more errors as described in the previous examples. As an example, assume that a derived spreadsheet 50 was determined to be inaccurately derived from source spreadsheet 30. In this example, user 14a may be requested to assist user 14b in locating the error within derived spreadsheet 50. FIG. 5A illustrates an example regenerated source spreadsheet 70 based on source spreadsheet 30, which may be generated by user 14a to help identify the location of the error in derived spreadsheet 50. Regenerated source spreadsheet 70 may include the contents of source spreadsheet 30 described above with reference to FIG. 2 such that columns 32a-32h and rows 34a-34d are included in regenerated source spreadsheet 70. In creating regenerated source spreadsheet 70, user 14a may expand source spreadsheet 30 to include an additional row 72 and an additional column 74 as shown in regenerated source spreadsheet 70. Row 72 may be inserted as row "5," and column 74 may be inserted as column "G." In this example, assume that the portion of source spreadsheet 30 used to derive derived spreadsheet 50 consists of cells (B,2:E,3) in regenerated source spreadsheet 70, which will be described as predetermined portion 71. In one embodiment, predetermined portion 71 of regenerated source spreadsheet 70 may have corresponding row check-characters 76 and column check-characters 78 that may be generated and stored. For example, the row check-characters 76a for cells (B,2:E,2) may be stored in cell (H,2) while the column check-characters 78a for cells (B,2:B,3) may be stored in cells (B,5). This process may be repeated for the row (B,3:E,3) and columns (C,2:C,3) through (E,2:E,3). The code-generating algorithm may be applied to check-characters 76 and check-characters 78 to generate new code 36 as shown in cell (H,5). After user 14a generates the row check-characters 76, column check-characters 78, and new code 36, user 14a may communicate regenerated source spreadsheet 70 to user 14b at site 16b or otherwise make regenerated source spreadsheet 70 accessible to user system 14b, such as by storing regenerated source spreadsheet 70 in a database accessible to user system 14b.

FIG. 5B illustrates an example regenerated derived spreadsheet 90, which may include a predetermined portion 91 that was included in derived spreadsheet 50 and was determined to have been inaccurately derived from source spreadsheet 30 (i.e. the value "3101" in cell (E,3) of regenerated derived spreadsheet 90 does not match the value "1301" in cell (E,3) of regenerated source spreadsheet 70). Based on the received regenerated source spreadsheet 70, user 14b may create regenerated derived spreadsheet 90 by adding the additional row 72 and column 74 data received from user 14a in regenerated source spreadsheet 70 into regenerated derived spreadsheet 50 as additional row 92 (row 5) and additional column 94 (column G) of regenerated derived spreadsheet 90. User 14b may generate new check-characters 97 for the rows including cells (B,2:E,3) and new column check-characters 98 for the columns including cells (B,6:E,6). Check-characters 97 may be stored in new column 300 (column H) of regenerated derived spreadsheet 90, and check-characters 98 may be stored in new row 302 (row 6) of regenerated derived spreadsheet 90. In this example, the result may include a comparison indicator 96 that indicates "ERROR" or the like, with indicators at cells (H,3) and (E,6) whose intersection is cell (t,3), the failing cell. Closer inspection will reveal that cell (E,3) of regenerated derived spreadsheet 90 (and derived spreadsheet 50) should have included the value "1301" rather than the "3101" that was entered. As illustrated, the cell containing the error (E,3) may, in certain embodiments, be highlighted, shaded, or otherwise indicated. On correction the correct check-character 97c will be generated along with correct corresponding sub-total in cell (E,4).

FIG. 6 illustrates an example method for identifying the location of one or more errors in a derived spreadsheet 50 determined to have been inaccurately derived from source spreadsheet 30, as described above with reference to FIG. 4. At step 200, user system 14a ensures that the check-characters in code 36 of source spreadsheet 30 match the check-characters in code 36 of derived spreadsheet 50. If the check-characters do not match, then the error may need to be corrected in order to regenerate the correct check-character in source spreadsheet 30. If, on regenerating a correct check-character in source spreadsheet 30 an error still exists, then, at step 202, user 14a may re-initiate the validating function to generate check-characters 76 and check-characters 78 for the rows and columns of predetermined portion 71 of regenerated source spreadsheet 70 (as illustrated in row 72a and column 74a of regenerated source spreadsheet 70), resulting in regenerated source spreadsheet 70. At step 204, the validating function may re-access the same values in the rows and columns of predetermined portion 71 of regenerated source spreadsheet 70 (that were included in source spreadsheet 30 and used to derive the inaccurately derived spreadsheet 50). As described above, check-characters 76 and 78 may include any combination of alphabetic characters, numbers, symbols, or other suitable characters according to particular needs. At step 206, the validating function may apply the code-generating algorithm to the check-characters 76 and check-characters 78 in additional row 72 and additional column 74 of regenerated source spreadsheet 70 to generate new code 36 in regenerated source spreadsheet 70.

At step 208, user system 14a may communicate regenerated source spreadsheet 70 to user system 14b at site 16b or otherwise makes regenerated source spreadsheet 70 accessible to user system 14b, such as by storing regenerated source spreadsheet 70 in a database accessible to user system 14b. User system 14a may re-communicate regenerated source spreadsheet 70 to user system 14b in any suitable manner according to particular needs. For example, user system 14a may transmit regenerated source spreadsheet 70 via electronic mail, read the contents of regenerated source spreadsheet 70 to user system 14b over the telephone, or transmit a copy of regenerated source spreadsheet 70 by facsimile. At step 210, user system 14b may generate regenerated derived spreadsheet 90 using the regenerated source spreadsheet 70 received from user system 14a. User system 14b manually or autonomously initiates a validating function associated with user system 14b at step 212 and, at step 214, the validating function accesses the values in predetermined portion 91 of regenerated derived spreadsheet 90 corresponding to predetermined portion 71 of source spreadsheet 70. At step 216, the validating function applies the code-generating algorithm to the values in predetermined portion 91 of regenerated derived spreadsheet 90 to generate check-characters 97 and check-characters 98 representing the values in the rows and columns, respectively, of predetermined portion 91 of regenerated derived spreadsheet 90.

At step 218, it is determined whether a check-character 76 or 78 representing the values in predetermined portion 71 of regenerated source spreadsheet 70 does not match a corresponding check-character 97 and 98 representing the values in predetermined portion 91 of regenerated derived spreadsheet 90. In one embodiment, the validating function initiated by user system 14b, automatically upon generation of check-characters 97 and 98 compares check-characters 97 and 98 to the corresponding check-characters 76 and 78 of predetermined portion 91 to determine whether a check-character 76 or 78 does not match a corresponding check-character 97 or 98. In another embodiment, user system 14b may visually compare check-characters 97 and 98 to corresponding check-characters 76 and 78 to determine whether a check-character 76 or 78 does not match a check-character 97 or 98. If it is determined at step 218 that a check-character 97 or 98 does not match a corresponding check-character 76 or 78, then at step 220 it can be determined at the intersections of the rows and the columns of the non-matching check-characters 97 and 98 where the non-matching value is located. At step 222, by comparing the values identified at the failing location in the predetermined portion 91 of regenerated derived spreadsheet 90 with the values at the identical location in predetermined portion 71 of regenerated source spreadsheet 70, the failing values can be determined and corrected within predetermined portion 91 of derived spreadsheet 50 in order to generate the correct check-characters 97 and 98. In one embodiment, the values identified at the failing location in the predetermined portion 91 of regenerated derived spreadsheet 90 are visually compared to the values at the identical location in predetermined portion 71 of regenerated source spreadsheet 70. In another embodiment, the validating function may automatically compare the values identified at the failing location in the predetermined portion 91 of regenerated derived spreadsheet 90 to the values at the identical location in predetermined portion 71 of regenerated source spreadsheet 70. At step 224, the validating function is re-initiated to regenerate check-characters 97 and 98 in regenerated derived spreadsheet 90, and the method returns to step 218 to determine if the error was properly corrected or to determine the location of another error.

Although the present invention has been described with several embodiments, diverse changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A system for validating one or more data blocks in a document derived from another document, comprising one or more processors collectively operable to:

access a plurality of first values in a predetermined portion of a source document;

apply a code-generating algorithm to the first values in the predetermined portion of the source document to generate a first code representing the first values in the predetermined portion of the source document;

access a plurality of second values in a predetermined portion of a document derived from the source document, the predetermined portion of the derived document corresponding to the predetermined portion of the source document; and apply the code-generating algorithm to the second values in the predetermined portion of the derived document to generate a second code representing the second values in the predetermined portion of the derived document;

where, if the first code representing the first values in the predetermined portion of the source document matches the second code representing the second values in the predetermined portion of the derived document, it can be assumed that within a predefined probability the derived document was accurately derived from the source document in that the second values in the predetermined portion of the derived document match the first values in the predetermined portion of the source document;

wherein:

the first values in the predetermined portion of the source document and second values in the predetermined portion of the derived document comprise only numerical digits;

the first code generated through application of the code-generating algorithm to the first values in the predetermined portion of the source document and the second code generated through application of the code-generating algorithm to the second values in the predetermined portion of the derived document each comprise only alphabetic characters; and the code-generating algorithm comprises:

calculating a weighted sum of the numerical digits of the first values in the predetermined portion of the source document;

applying a modulus(p) to the weighted sum to determine a result, p being a prime number;

calculating a complement of the modulus(p) as a check-digit; and converting the determined result and the check-digit into alphabetic characters.

2. The system of claim 1, wherein the source document and the derived document comprise spreadsheets and the data blocks comprise data entries in the spreadsheets.

3. The system of claim 1, wherein the source document and the derived document comprise text documents and the data blocks comprise at least one of:
   a letter;
   a word;
   a phrase;
   a sentence; and
   a paragraph.

4. The system of claim 1, wherein the one or more processors are further operable to, automatically upon generation of the second code representing the second values in the predetermined portion of the derived document, compare the first code representing the first values in the predetermined portion of the source document to the second code representing the second values in the predetermined portion of the derived document to determine whether the first values match the second values.

5. The system of claim 4, wherein the one or more processors are further operable to, automatically upon comparison of the first code representing the first values in the predetermined portion of the source document to the second code representing the second values in the predetermined portion of the derived document, determine a comparison indicator indicating TRUE or MATCH if the second code is determined to match the first code or FALSE or ERROR if the second code is determined not to match the first code.

6. The system of claim 1, wherein the code-generating algorithm is implemented and the source and derived documents are generated using at least one of:
   MICROSOFT WORD;
   COREL WORDPERFECT;
   MICROSOFT EXCEL;
   LOTUS 1-2-3;
   an electronic mail application; and
   a web page application.

7. A method for validating one or more data blocks in a document derived from another document, comprising:
   accessing a plurality of first values in a predetermined portion of a source document;
   applying a code-generating algorithm to the first values in the predetermined portion of the source document to generate a first code representing the first values in the predetermined portion of the source document;
   accessing a plurality of second values in a predetermined portion of a document derived from the source document, the predetermined portion of the derived document corresponding to the predetermined portion of the source document; and
   applying the code-generating algorithm to the second values in the predetermined portion of the derived document to generate a second code representing the second values in the predetermined portion of the derived document;
   where, if the first code representing the first values in the predetermined portion of the source document matches the second code representing the second values in the predetermined portion of the derived document, it can be assumed that within a predefined probability the derived document was accurately derived from the source document in that the second values in the predetermined portion of the derived document match the first values in the predetermined portion of the source document;
   wherein:
      the first values in the predetermined portion of the source document and second values in the predetermined portion of the derived document comprise only numerical digits;
      the first code generated through application of the code-generating algorithm to the first values in the predetermined portion of the source document and the second code generated through application of the code-generating algorithm to the second values in the predetermined portion of the derived document each comprise only alphabetic characters; and
      the code-generating algorithm comprises:
         calculating a weighted sum of the numerical digits of the first values in the predetermined portion of the source document;
         applying a modulus(p) to the weighted sum to determine a result, p being a prime number;
         calculating a complement of the modulus(p) as a check-digit; and
         converting the determined result and the check-digit into alphabetic characters.

8. The method of claim 7, wherein the source document and the derived document comprise spreadsheets and the data blocks comprise data entries in the spreadsheets.

9. The method of claim 7, wherein the source document and the derived document comprise text documents and the data blocks comprise at least one of:
   a letter;
   a word;
   a phrase;
   a sentence; and
   a paragraph.

10. The method of claim 7, further comprising, automatically upon generating the second code representing the second values in the predetermined portion of the derived document, comparing the first code representing the first values in the predetermined portion of the source document to the second code representing the second values in the predetermined portion of the derived document to determine whether the first values match the second values.

11. The method of claim 10, further comprising, automatically upon comparing the first code representing the first values in the predetermined portion of the source document to the second code representing the second values in the predetermined portion of the derived document, determining a comparison indicator indicating TRUE or MATCH if the second code is determined to match the first code or FALSE or ERROR if the second code is determined not to match the first code.

12. The method of claim 7, wherein the code-generating algorithm is implemented and the source and derived documents are generated using at least one of:
   MICROSOFT WORD;
   COREL WORDPERFECT;
   MICROSOFT EXCEL;
   LOTUS 1-2-3;
   an electronic mail application; and
   a web page application.

13. A computer-implemented system operable to generate a visual display representing a document derived from another document, the visual display comprising:
   a plurality of second values in a predetermined portion of a document derived from a source document, the predetermined portion of the derived document corresponding to a predetermined portion of the source document comprising a plurality of first values; and an indicator indicating whether a second code representing the second values in the predetermined portion of the derived document, the second code having been generated by accessing the second values in the predetermined portion of the derived document and applying a code-generating algorithm to the second values in the predetermined portion of the derived document, matches a first code representing the first values in the predetermined portion of the source document, the first code having been generated by accessing the first values in the predetermined portion of the source document and applying a code-generating algorithm to the first values in the predetermined portion of the source document;

where, if the second code representing the second values in the predetermined portion of the derived document matches the first code representing the first values in the predetermined portion of the source document, it can be assumed that within a predefined probability the derived document was accurately derived from the source document in that the second values in the predetermined portion of the derived document match the first values in the predetermined portion of the source document;

wherein:

the first values in the predetermined portion of the source document and second values in the predetermined portion of the derived document comprise only numerical digits;

the first code generated through application of the code-generating algorithm to the first values in the predetermined portion of the source document and the second code generated through application of the code-generating algorithm to the second values in the predetermined portion of the derived document each comprise only alphabetic characters; and the code-generating algorithm comprises:

calculating a weighted sum of the numerical digits of the first values in the predetermined portion of the source document;

applying a modulus(p) to the weighted sum to determine a result, p being a prime number;

calculating a complement of the modulus(p) as a check-digit; and converting the determined result and the check-digit into alphabetic characters.

14. The system of claim 13, wherein the source document and the derived document comprise spreadsheets, the spreadsheets comprising one or more data entries.

15. The system of claim 13, wherein the source document and the derived document comprise text documents, the text document comprising one or more letters, words, phrases, sentences, or paragraphs.

16. The system of claim 13, wherein the system is further operable to, automatically upon generation of the second code representing the second values in the predetermined portion of the derived document, compare the first code representing the first values in the predetermined portion of the source document to the second code representing the second values in the predetermined portion of the derived document to determine whether the first values match the second values.

17. The system of claim 13, wherein the code-generating algorithm is implemented and the source document, derived document, and visual display are generated using at least one of:

MICROSOFT WORD;
COREL WORDPERFECT;
MICROSOFT EXCEL;
LOTUS 1-2-3;
an electronic mail application; and
a web page application.

18. A computer-implemented method for generating a visual display representing a document derived from another document, the method comprising:

displaying a plurality of second values in a predetermined portion of a document derived from a source document, the predetermined portion of the derived document corresponding to a predetermined portion of the source document comprising a plurality of first values; and displaying an indicator indicting whether a second code representing the second values in the predetermined portion of the derived document, the second code having been generated by accessing the second values in the predetermined portion of the derived document and applying a code-generating algorithm to the second values in the predetermined portion of the derived document, matches a first code representing the first values in the predetermined portion of the source document, the first code having been generated by accessing the first values in the predetermined portion of the source document and applying a code-generating algorithm to the first values in the predetermined portion of the source document;

where, if the first code representing the first values in the predetermined portion of the source document matches the second code representing the second values in the predetermined portion of the derived document, it can be assumed that within a predefined probability the derived document was accurately derived from the source document in that the second values in the predetermined portion of the derived document match the first values in the predetermined portion of the source document;

wherein:

the first values in the predetermined portion of the source document and second values in the predetermined portion of the derived document comprise only numerical digits;

the first code generated through application of the code-generating algorithm to the first values in the predetermined portion of the source document and the second code generated through application of the code-generating algorithm to the second values in the predetermined portion of the derived document each comprise only alphabetic characters; and the code-generating algorithm comprises:

calculating a weighted sum of the numerical digits of the first values in the predetermined portion of the source document;

applying a modulus(p) to the weighted sum to determine a result, p being a prime number;

calculating a complement of the modulus(p) as a check-digit; and converting the determined result and the check-digit into alphabetic characters.

19. The method of claim 18, wherein the source document and the derived document comprise spreadsheets, the spreadsheets comprising one or more data entries.

20. The method of claim 18, wherein the source document and the derived document comprise text documents, the text document comprising one or more letters, words, phrases, sentences, or paragraphs.

21. The method of claim 18, wherein the method further comprises, automatically upon generating the second code representing the second values in the predetermined portion of the derived document, comparing the first code representing the first values in the predetermined portion of the source document to the second code representing the second values in the predetermined portion of the derived document to determine whether the first values match the second values.

22. The method of claim 18, wherein the code-generating algorithm is implemented and the source document, derived document, and visual display are generated using at least one of:
MICROSOFT WORD;
COREL WORDPERFECT;
MICROSOFT EXCEL;
LOTUS 1-2-3;
an electronic mail application; and
a web page application.

23. Software for generating a visual display representing a document derived from another document, the software being embodied in computer-readable media and when executed operable to generate the visual display, the visual display comprising:
a plurality of second values in a predetermined portion of a document derived from a source document, the predetermined portion of the derived document corresponding to a predetermined portion of the source document comprising a plurality of first values; and
an indicator indicating whether a second code representing the second values in the predetermined portion of the derived document, the second code having been generated by accessing the second values in the predetermined portion of the derived document and applying a code-generating algorithm to the second values in the predetermined portion of the derived document, matches a first code representing the first values in the predetermined portion of the source document, the first code having been generated by accessing the first values in the predetermined portion of the source document and applying a code-generating algorithm to the first values in the predetermined portion of the source document;
where, if the second code representing the second values in the predetermined portion of the derived document matches the first code representing the first values in the predetermined portion of the source document, it can be assumed that within a predefined probability the derived document was accurately derived from the source document in that the second values in the predetermined portion of the derived document match the first values in the predetermined portion of the source document;
wherein:
the first values in the predetermined portion of the source document and second values in the predetermined portion of the derived document comprise only numerical digits;
the first code generated through application of the code-generating algorithm to the first values in the predetermined portion of the source document and the second code generated through application of the code-generating algorithm to the second values in the predetermined portion of the derived document each comprise only alphabetic characters; and
the code-generating algorithm comprises:
calculating a weighted sum of the numerical digits of the first values in the predetermined portion of the source document;
applying a modulus(p) to the weighted sum to determine a result, p being a prime number;
calculating a complement of the modulus(p) as a check-digit; and
converting the determined result and the check-digit into alphabetic characters.

24. The software of claim 23, wherein the source document and the derived document comprise spreadsheets, the spreadsheets comprising one or more data entries.

25. The software of claim 23, wherein the source document and the derived document comprise text documents, the text document comprising one or more letters, words, phrases, sentences, or paragraphs.

26. The software of claim 23, further operable to, automatically upon generation of the second code representing the second values in the predetermined portion of the derived document, compare the first code representing the first values in the predetermined portion of the source document to the second code representing the second values in the predetermined portion of the derived document to determine whether the first values match the second values.

27. The software of claim 23, wherein the code-generating algorithm is implemented and the source document, derived document, and visual display are generated using at least one of:
MICROSOFT WORD;
COREL WORDPERFECT;
MICROSOFT EXCEL;
LOTUS 1-2-3;
an electronic mail application; and
a web page application.

28. Computer-readable media comprising software that when executed is operable to generate a visual display of a document derived from another document, the derived document comprising:
a plurality of second values in a predetermined portion of a document derived from a source document, the predetermined portion of the derived document corresponding to a predetermined portion of the source document comprising a plurality of first values; and
an indicator indicating whether a second code representing the second values in the predetermined portion of the derived document, the second code having been generated by applying the code-generating algorithm to the second values in the predetermined portion of the derived document, matches a first code representing the first values in the predetermined portion of the source document, the first code having been generated by accessing the first values in the predetermined portion of the source document and applying a code-generating algorithm to the first values in the predetermined portion of the source document;
where, if the second code representing the second values in the predetermined portion of the derived document matches the first code representing the first values in the predetermined portion of the source document, it can be assumed that within a predefined probability the derived document was accurately derived from the source document in that the second values in the predetermined portion of the derived document match the first values in the predetermined portion of the source document;

wherein:

the first values in the predetermined portion of the source document and second values in the predetermined portion of the derived document comprise only numerical digits;

the first code generated through application of the code-generating algorithm to the first values in the predetermined portion of the source document and the second code generated through application of the code-generating algorithm to the second values in the predetermined portion of the derived document each comprise only alphabetic characters; and the code-generating algorithm comprises:

calculating a weighted sum of the numerical digits of the first values in the predetermined portion of the source document;

applying a modulus(p) to the weighted sum to determine a result, p being a prime number;

calculating a complement of the modulus(p) as a check-digit; and converting the determined result and the check-digit into alphabetic characters.

29. The media of claim 28, wherein the source document and the derived document comprise spreadsheets, the spreadsheets comprising one or more data entries.

30. The media of claim 28, wherein the source document and the derived document comprise text documents, the text document comprising one or more letters, words, phrases, sentences, or paragraphs.

31. The media of claim 28, wherein the first code representing the first values in the predetermined portion of the source document has been, automatically upon generation of the second code representing the second values in the predetermined portion of the derived document, compared to the second code representing the second values in the predetermined portion of the derived document to determine whether the first values match the second values.

32. The media of claim 28, wherein the code-generating algorithm is implemented and the source document, derived document, and visual display are generated using at least one of:

MICROSOFT WORD;

COREL WORDPERFECT;

MICROSOFT EXCEL;

LOTUS 1-2-3;

an electronic mail application; and a web page application.

* * * * *